D. WOLF.
Mowing-Machine.
No. 168,700.
Patented Oct. 11, 1875.
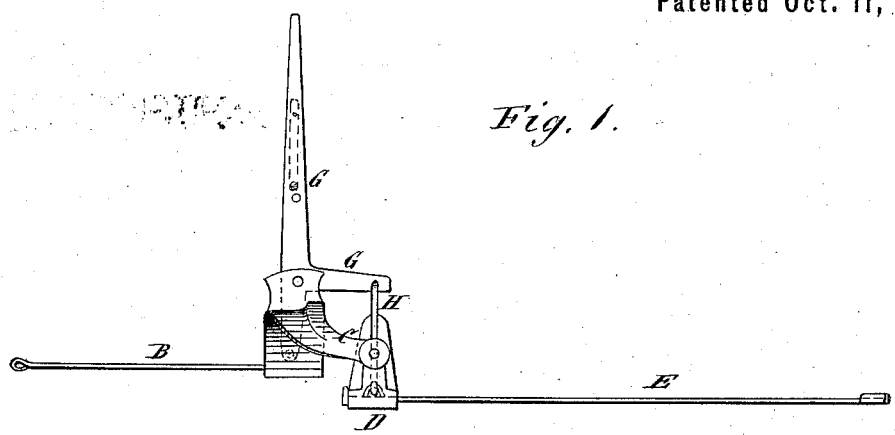
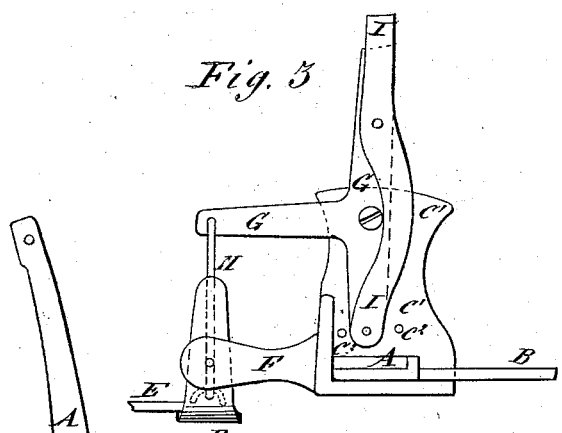
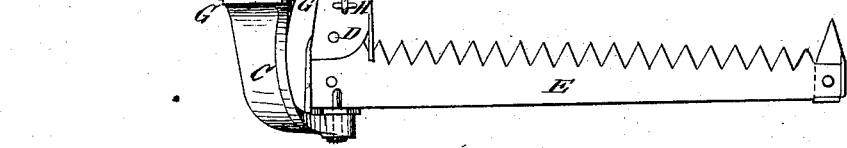
WITNESSES:
INVENTOR:
David Wolf
BY
ATTORNEYS.

UNITED STATES PATENT OFFICE.

DAVID WOLF, OF AVON, PENNSYLVANIA.

IMPROVEMENT IN MOWING-MACHINES.

Specification forming part of Letters Patent No. 168,700, dated October 11, 1875; application filed April 24, 1875.

*To all whom it may concern:*

Be it known that I, DAVID WOLF, of Avon, in the county of Lebanon and State of Pennsylvania, have invented a new and useful Improvement in Mowers and Reapers, of which the following is a specification:

Figure 1 is a rear view of a cutter-bar and its attachments to which my improvement has been applied. Fig. 2 is a top view of the same. Fig. 3 is a front view of the same.

Similar letters of reference indicate corresponding parts.

The object of this invention is to furnish an improvement in the construction of mowers and reapers that will enable the cutter-bar to be conveniently locked in different positions, to adapt it for work upon smooth ground, upon rough or stony ground, or in lodged grass or grain, and which will enable the cutter-bar to be locked in an upright position for passing from place to place.

The invention will first be described in connection with drawing, and then pointed out in the claim.

A is the draft-bar, which is designed to be secured to the lower side of the tongue to resist the side draft. B is the stay-bar, which is designed to be connected with the frame of the machine. C is the stay-brace, which curves downward and outward, and to the forward side of the outer end of which is pivoted the rear end of the shoe D, to which the cutter-bar E is attached. The upwardly-projecting end of the shoe D has a slot or groove formed in it to receive the pivot attached to the stay-arm F. Upon the stay-brace C is formed an upwardly-projecting flange, $c^1$, in the upper part of which is formed a hole to receive the pivot of the regulating-lever G, which is made with three arms, and is pivoted at the point of meeting of said three arms to the upper part of the extension or flange $c^1$ of the stay-brace C. To the end of the side arm of the lever G is pivoted the upper end of the connecting-rod H, the lower end of which is pivoted to the shoe D. The upper arm of the lever G projects into such a position that it may be conveniently reached and operated by the driver. To the side of the lever G is pivoted the lever-catch I, the catch-pin attached to the lower end of which passes through a hole in the lower end of the lower arm of the lever G, and enters one or the other of the three or more holes, $c^2$, formed in the lower part of the extension or flange $c^1$ of the stay-brace C, so as to hold the cutter-bar E securely when adjusted. By this construction, also, when the cutter-bar has been turned into an upright position, by adjusting the lever G to bring the pin of the catch-lever I into the third hole, the said cutter-bar will be locked in that position.

Having thus described my invention, I claim as new and desire to secure by Letters Patent—

The combination of stay-brace C, curved downwardly as well as outwardly, and having flange $c^1$, the shoe D, pivoted at the rear to the forward side of said stay-brace, and the regulating-lever G, pivoted to said flange $c^1$, all constructed and arranged substantially as and for the purpose specified.

DAVID WOLF.

Witnesses:
JOHN N. GOOD,
JOHN G. WEAVER.